US011445858B2

(12) United States Patent
Bogazzi

(10) Patent No.: US 11,445,858 B2
(45) Date of Patent: *Sep. 20, 2022

(54) LID RETAINING HANDLE FOR COOKING DEVICE

(71) Applicant: The Big Green Egg, Inc., Atlanta, GA (US)

(72) Inventor: Marco Bogazzi, Kennesaw, GA (US)

(73) Assignee: The Big Green Egg, Inc., Atlanta, GA (US)

( * ) Notice: Subject to any disclaimer, the term of this patent is extended or adjusted under 35 U.S.C. 154(b) by 339 days.

This patent is subject to a terminal disclaimer.

(21) Appl. No.: 15/539,632

(22) PCT Filed: Dec. 24, 2015

(86) PCT No.: PCT/US2015/000363
§ 371 (c)(1),
(2) Date: Jun. 23, 2017

(87) PCT Pub. No.: WO2016/105544
PCT Pub. Date: Jun. 30, 2016

(65) Prior Publication Data
US 2017/0367534 A1    Dec. 28, 2017

Related U.S. Application Data

(60) Provisional application No. 62/096,804, filed on Dec. 24, 2014.

(51) Int. Cl.
A47J 37/07       (2006.01)
B65D 43/08       (2006.01)
A47J 37/04       (2006.01)

(52) U.S. Cl.
CPC .......... *A47J 37/0786* (2013.01); *B65D 43/08* (2013.01); *A47J 37/049* (2013.01); *A47J 37/0704* (2013.01)

(58) Field of Classification Search
CPC .... A47J 36/12; A47J 37/0704; A47J 37/0763; A47J 36/06; A47J 37/0786; A47J 27/002;
(Continued)

(56) References Cited

U.S. PATENT DOCUMENTS 2,491,144 A * 12/1949 Yankovitch ........... A47J 27/092
                                                                220/301
2,974,990 A *  3/1961 Mereness .............. B65F 1/1615
                                                                292/288

(Continued)

FOREIGN PATENT DOCUMENTS

WO       2013/116946 A1    8/2013

OTHER PUBLICATIONS

International Search Report and Written Opinion for PCT/US2015/000363, dated May 17, 2016.

*Primary Examiner* — Tu B Hoang
*Assistant Examiner* — Vy T Nguyen
(74) *Attorney, Agent, or Firm* — Merchant & Gould P.C.

(57) ABSTRACT

A handle for a cooking device that limits movement of the device's lid relative to a band extending around the lid. The handle couples to the band and also engages a rim or ridge of the lid to resist movement of the band in a direction away from the rim or ridge and toward the lid's edge. The lid retaining handle has a grip for grasping by a user of the cooking device to open or close the lid relative to the cooking device's base.

10 Claims, 2 Drawing Sheets

(58) Field of Classification Search
CPC .... A47J 36/34; A47J 2037/0777; A47J 36/08; A47J 36/10; A47J 36/36; A47J 36/38; A47J 37/0635; A47J 37/07; A47J 37/0713; A47J 37/0718; A47J 37/0727; A47J 37/0731; A47J 37/079; A47J 37/101; A47J 43/28; A47J 45/065; A47J 45/074; A61L 2202/121; A61L 2202/122; A61L 2202/182; A61L 2202/24; A61L 2/10; A61L 2/18; A61L 2/20; A61L 2/24; A61L 2/28; A61L 2202/21; A47G 21/02; A47G 21/04; A47G 21/10; A47G 23/0233; A47G 2400/025; F16B 43/001; F16B 43/025; F16B 45/00; F16M 13/005; F16M 13/02
USPC ......... 99/400, 401, 445, 446, 448, 449, 450, 99/482; 126/25 R, 9 R, 41 R, 152 B, 194, 126/25 A, 275 R, 30, 304 R, 389.1; 220/573.1, 293, 759, 212.5, 297, 298, 220/300, 315, 318, 375, 379, 592.22, 694, 220/710.5, 744, 765, 773, 810, 831, 912; 422/292, 300, 256, 261, 28, 301, 305, 62
See application file for complete search history.

(56) References Cited

U.S. PATENT DOCUMENTS

| | | | |
|---|---|---|---|
| 4,836,179 A | 6/1989 | Schlosser et al. | |
| 5,251,542 A * | 10/1993 | Itoh | A47J 36/10 206/545 |
| 5,442,998 A * | 8/1995 | Niese | A47J 27/0813 126/369 |
| D612,807 S | 5/2010 | Creel | |
| 7,770,576 B2 | 8/2010 | Polkinghorn et al. | |
| 2004/0200851 A1* | 10/2004 | Wooderson | A47J 45/062 220/759 |
| 2009/0308373 A1 | 12/2009 | Scott et al. | |
| 2010/0213206 A1* | 8/2010 | Greene | A47G 23/0216 220/752 |
| 2013/0319258 A1 | 12/2013 | Cleveland et al. | |
| 2014/0084006 A1* | 3/2014 | Sandford | A47J 36/10 220/318 |

* cited by examiner

LID RETAINING HANDLE FOR COOKING DEVICE

This application is being filed on 24 Dec. 2015, as a PCT International Patent application and claims the benefit of priority of U.S. Provisional patent application Ser. No. 62/096,804, filed Dec. 24, 2014, the entire disclosure of which is incorporated by reference in its entirety.

FIELD OF THE INVENTION

The present invention relates, generally, to the field of cooking devices such as cookers, smokers and grills for food preparation, and to, more particularly, apparatuses and methods for retaining a lid of a cooking device.

BACKGROUND OF THE INVENTION

Many cooking devices for grilling or smoking food items have a lid that is connected to a base such that the lid may be moved relative to the base between open and closed positions. When the lid is in a closed position, the lid and base form a cavity in which food items typically reside atop a cooking grid during cooking. When the lid is in an open position, the cooking grid and food items present on the cooking grid are accessible from outside of the cooking device such as, for turning from one side to another or repositioning at a different location atop the cooking grid.

In such cooking devices, the lid and base are typically connected by a hinge, pivot, or other mechanism that permits the lid to be movable relative to the base between open and closed positions. In certain Kamado-style cooking devices, the mechanism may be coupled to a band that extends at least partially about a portion of the lid. Similarly, the mechanism may be coupled to another band that extends at least partially about a portion of the base. Together, the bands secure the mechanism, respectively, to the lid and base. The bands generally reside adjacent respective rims or ridges of the lid and base, and are generally pulled tight about the lid or base, as the case may be, during assembly of the cooking device. The rims or ridges tend to limit relative movement between the lid or base and a respective band in a direction away from an edge of the lid or base. Due at least partially to the rims or ridges and due at least partially to the bands being pulled tight, there is generally very limited relative movement between a band and the respective lid or base during movement of the lid relative to the base.

Unfortunately, if the band extending at least partially about the lid is not tightened sufficiently during assembly of the cooking device, the lid and band may slide or move relative to one another (particularly, during movement of the lid from an open position to a closed position), thereby allowing the lid to separate from the band and mechanism. If such separation occurs and, particularly, if the lid is made from a ceramic material having substantial weight, the lid may uncontrollably fall from the remainder of the cooking device and potentially injure a nearby person or property.

There is, therefore, a need in the industry for a device that aids in preventing relative sliding or movement between the lid of a cooking device and a band extending at least partially about the lid, and that solves these and other problems, deficiencies, and shortcomings of present cooking devices.

SUMMARY OF THE INVENTION

Broadly described, the present invention comprises an apparatus and method for limiting relative movement between a band extending at least partially about a lid or base of a cooking device and the respective lid or base. According to an example embodiment and without limitation, the apparatus comprises a lid retaining handle that limits relative movement between a band extending at least partially about a lid of a cooking device and the lid itself. The lid retaining handle is graspable by a user to move the lid between open and closed positions. The lid retaining handle includes band interface portions for residing substantially adjacent to and coupling to a band, and lid interface portions for residing adjacent to a rim or ridge of a cooking device's lid and for limiting movement of the band away from the rim or ridge and toward an edge of the lid. In accordance with the example embodiment and absent limitation, the method comprises using a rim or ridge of a cooking device's lid to limit relative movement between a band and the lid in one direction, while engaging the rim or ridge with the lid retaining handle to limit relative movement between the band and lid in another direction.

Advantageously, the lid retaining handle limits relative movement between a lid of a cooking device and a band extending at least partially around the lid and coupled to mechanism for opening or closing the lid relative to a base of the cooking device. More particularly, the lid retaining handle limits relative movement between the lid and band in which the band moves in a direction toward the lid's edge. By limiting such relative movement, the lid retaining handle tends to prevent or at least lessen the possibility that the cooking device's lid may separate from the mechanism and from the remainder of the cooking device.

Other uses, advantages and benefits of the present invention may become apparent upon reading and understanding the present specification when taken in conjunction with the appended drawings.

DETAILED DESCRIPTION OF THE DRAWINGS

Figure 1:
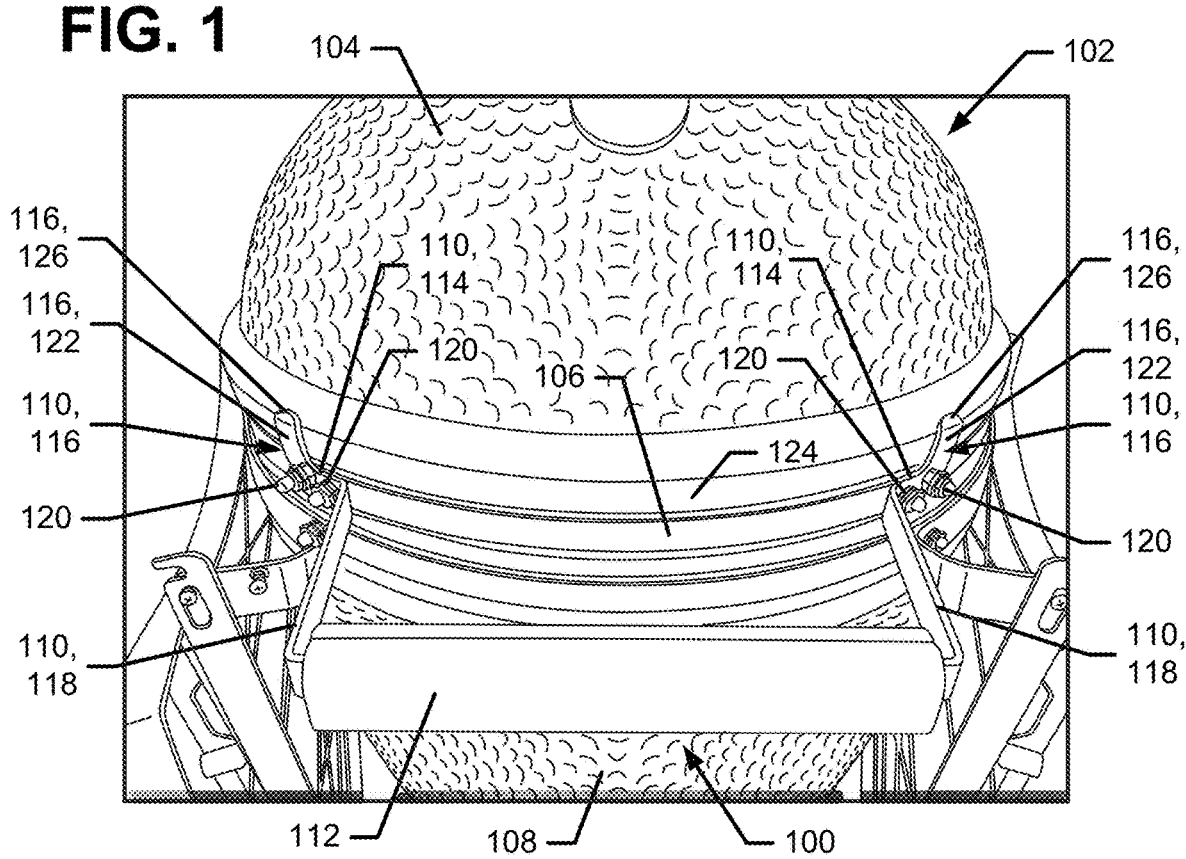
FIG. 1 displays a front, perspective view of a lid retaining handle in use attached to a cooking device, in accordance with an example embodiment of the present invention.
Figure 2:
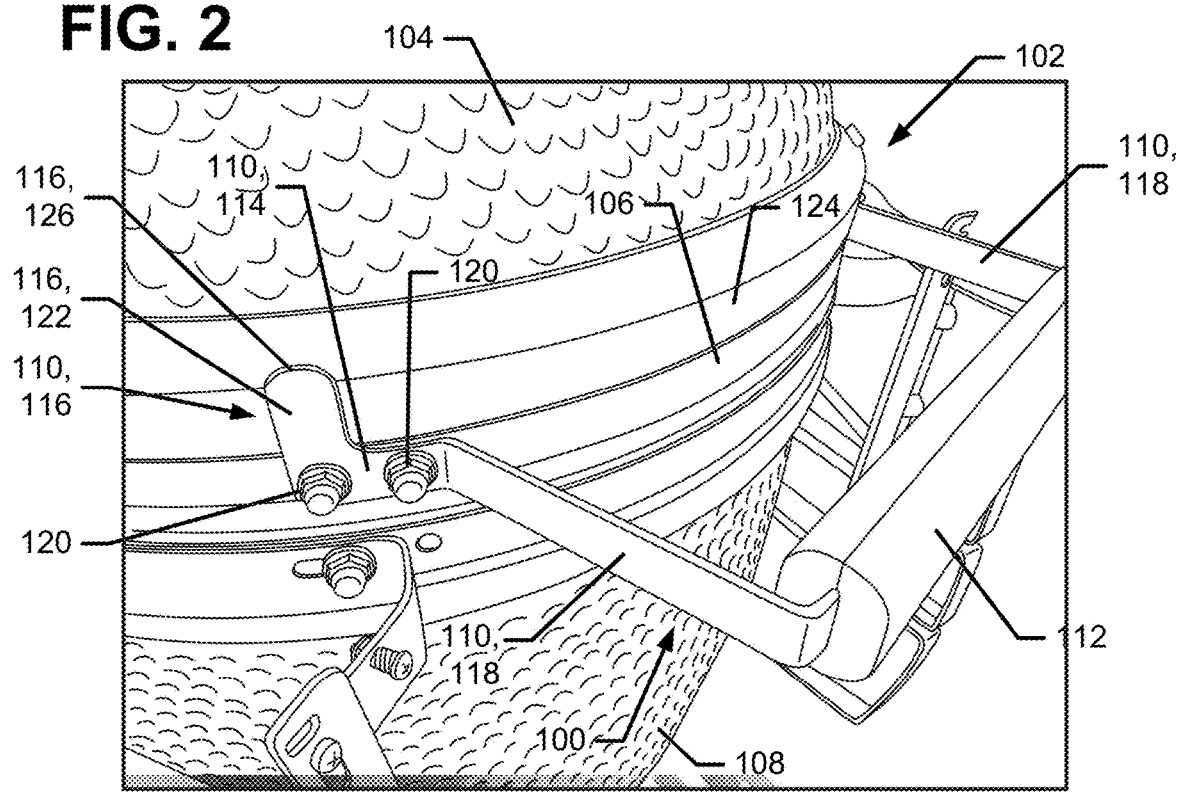
FIG. 2 displays a side, perspective view of the lid retaining handle of FIG. 1.

Referring now to the drawings in which like numerals represent like elements or steps throughout the several views, FIGS. 1 and 2 display a lid retaining handle 100 in use attached to a Kamado-style cooking device 102, according to an example embodiment of the present invention. The lid retaining handle 100 aids in securing a lid 104 of the cooking device 102 together with a band 106 of the cooking device 102, thereby reducing the possibility that the lid 104 may separate from the band 106 and the remainder of the cooking device 102 during opening and closing of the lid 104. Also, the lid retaining handle 100 is usable by a user of the cooking device 102 to aid in opening and closing the lid 104 relative to a base 108 of the cooking device 102.

Figure 3:
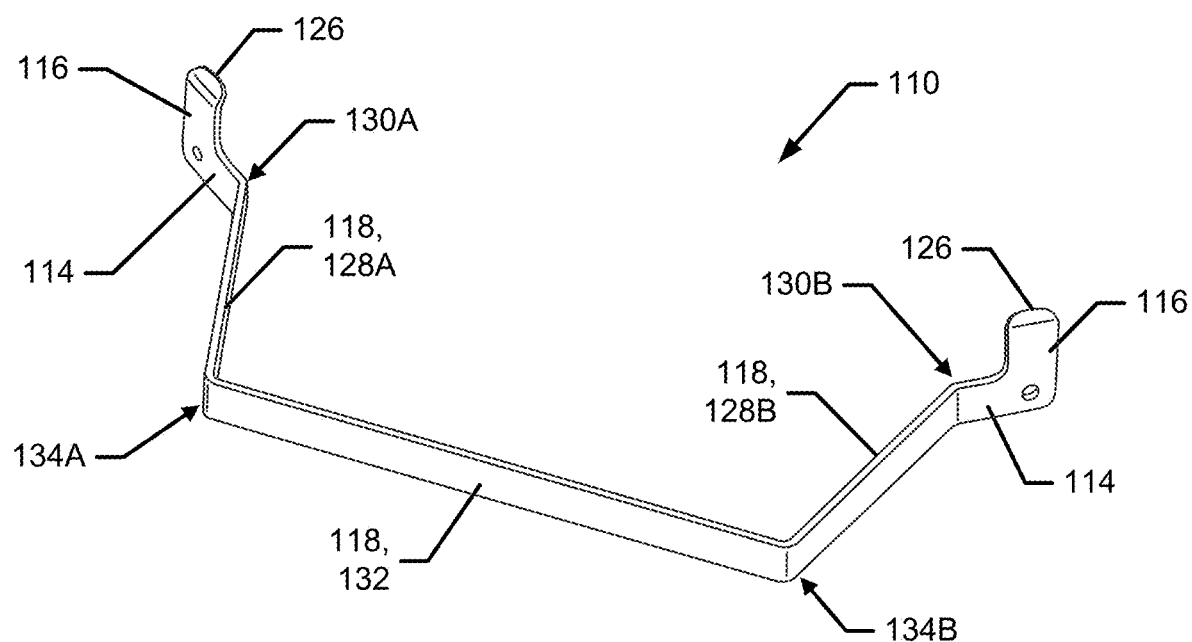
FIG. 3 displays a perspective view of a cooking device interface member of the lid retaining handle of FIG. 1.

The lid retaining handle 100 comprises, according to the example embodiment, a cooking device interface member 110 and a grip 112 that is secured to the cooking device interface member 110 for grasping by a user of the cooking device 100 during opening or closing of the device's lid 104 relative to the base 108. The cooking device interface member 110, seen alone in FIG. 3, includes a pair of band interface portions 114, a pair of lid interface portions 116, and a grip receiving portion 118.

The band interface portions 114 extend from the grip receiving portion 118 and are formed to fit snugly against and adjacent the cooking device's band 106. The band interface portions 114 are secured to the band 106 via a plurality of fasteners 120 (see FIGS. 1 and 2), thereby also securing the entire lid retaining handle 100 to the band 106. It should be appreciated and understood that in other example embodiments, the band interface portions 114 may be welded or secured by other apparatuses and methods to the band 106 or the lid retaining handle 100 may be integrally formed with the band 106.

The lid interface portions 116 extend, respectively, from the band interface portions 114 and are shaped to interface and interact with the lid 104. More particularly, each lid interface portion 116 defines a rim engagement portion 122 for engaging and residing generally adjacent to a rim 124 of the lid 104. Each lid interface portion 116 has a hook portion 126 extending from the rim engagement portion 122 for engaging the rim 124 or the lid 104 near the rim 124 (see also FIGS. 1 and 2), thereby limiting and restricting movement of the lid 104 relative to the respective lid interface portion 116 and to the lid retaining handle 100 and band 106. It should be appreciated and understood that in other example embodiments, the lid interface portions 116 may comprise retaining clips of a similar shape that are integrally formed with the band 106 instead of with a handle or that are formed as separate components attached to the band 106 by fasteners, welding, or other apparatuses or methods.

The grip receiving portion 118 extends from and between each of the band interface portions 114 and has a, generally, "U" shape when viewed in plain view. The grip receiving portion 118 includes first and second legs 128A, 128B that extend at an angle relative to respective band interface portions 114 at respective first ends 130A, 130B thereof and generally away from the cooking device 102 when the lid retaining handle 100 is secured to the cooking device 100 (see FIGS. 1 and 2). A lateral member 132 of the grip receiving portion 118 extends between the first and second legs 128A, 128B at respective second ends 134A, 134B thereof. The grip 112 fits and extends about a substantial length of the lateral member 132. The grip 112 is sized for being comfortably grasped by a user of the cooking device 102 to open and close the lid 104 relative to the cooking device's base 108.

Whereas the present invention has been described in detail above primarily with respect to an example embodiment thereof, it should be appreciated that variations and modifications might be effected within the spirit and scope of the present invention.

What is claimed is:

1. A lid retaining handle for a cooking device, the lid retaining handle comprising:
   a band extending around a lid of the cooking device, wherein the lid, when closed, is configured to cover a base of the cooking device, and wherein the band is configured to move relative to the lid when the band is coupled to the lid of the cooking device;
   a grip used to open the lid of the cooking device;
   a band interface coupled to an outer surface of the band and to the grip; and
   a lid interface extending from the band interface, the lid interface comprising a hook portion that extends from the band interface, wherein the lid interface is configured to receive and trap a part of a rim of the lid of the cooking device such that the lid interface is in contact with the rim, wherein the lid interface is located between the hook portion and the band interface such that the hook portion is configured to contact another part of the rim of the lid, wherein the rim extends about the lid, and wherein the lid interface is coupled to the lid at the same time that the band interface is coupled to the band; and
   wherein the lid interface restricts the movement of the band relative to the lid of the cooking device, wherein the band, the grip, the band interface, the lid interface, and the hook portion remain coupled to the lid during opening of the lid from the base of the cooking device.

2. The lid retaining handle of claim 1, wherein the lid interface engages a ridge of the lid.

3. The lid retaining handle of claim 2, wherein the hook portion engages the ridge of the lid.

4. The lid retaining handle of claim 1, wherein the band interface couples to the band using a fastener.

5. The lid retaining handle of claim 1, wherein the band interface couples to the band by welding.

6. The lid retaining handle of claim 1, further comprising a grip receiving portion that extends from the band interface.

7. The lid retaining handle of claim 6, wherein the grip receiving portion comprises a first leg and a second leg.

8. The lid retaining handle of claim 7, wherein the first leg and the second leg extend at an angle relative to the band interface.

9. The lid retaining handle of claim 7, wherein the grip receiving portion further comprises a lateral member that extends between the first leg and the second leg.

10. The lid retaining handle of claim 9, wherein the grip fits and extends about a substantial length of the lateral member.

* * * * *